US012090516B2

(12) United States Patent
Kruse et al.

(10) Patent No.: US 12,090,516 B2

(45) Date of Patent: Sep. 17, 2024

(54) SCREEN MAINTENANCE LINK

(71) Applicant: Terex USA, LLC, Westport, CT (US)

(72) Inventors: Jordan Kruse, Waverly, IA (US); Christopher Laurence Reed, Swisher, IA (US); Ryan Anthony Mumm, Newhall, IA (US)

(73) Assignee: Terex USA, LLC, Westport, CT (US)

( * ) Notice: Subject to any disclaimer, the term of this patent is extended or adjusted under 35 U.S.C. 154(b) by 318 days.

(21) Appl. No.: 17/739,570

(22) Filed: May 9, 2022

(65) Prior Publication Data

US 2022/0266301 A1 Aug. 25, 2022

Related U.S. Application Data

(62) Division of application No. 16/202,872, filed on Nov. 28, 2018, now Pat. No. 11,351,572.

(60) Provisional application No. 62/592,035, filed on Nov. 29, 2017.

(51) Int. Cl.

*B07B 1/28* (2006.01)
*B07B 1/00* (2006.01)
*B07B 1/46* (2006.01)
*B07B 13/18* (2006.01)

(52) U.S. Cl.

CPC ................ *B07B 1/005* (2013.01); *B07B 1/46* (2013.01); *B07B 13/18* (2013.01); *B07B 1/28* (2013.01)

(58) Field of Classification Search

CPC .. B07B 1/005; B07B 1/28; B07B 1/46; B07B 13/18

USPC .......................................................... 209/40

See application file for complete search history.

(56) References Cited

U.S. PATENT DOCUMENTS

2019/0160492 A1* 5/2019 Kruse ..................... B07B 13/18

FOREIGN PATENT DOCUMENTS

| | | | | |
|---|---|---|---|---|
| CA | 2105232 A1 | | 3/1995 | |
| CA | 2105232 C | * | 11/1996 | B07B 1/005 |
| CA | 2785363 A1 | * | 2/2013 | B02C 23/10 |
| CA | 2785363 C | | 6/2018 | |
| CA | 3025838 A1 | * | 5/2019 | B07B 1/005 |
| CN | 105579144 A | * | 5/2016 | B02C 21/02 |
| DE | 3934295 A1 | * | 4/1991 | |
| WO | WO-2019197706 A1 | * | 10/2019 | B07B 1/005 |

* cited by examiner

*Primary Examiner* — Terrell H Matthews

(74) *Attorney, Agent, or Firm* — Simmons Perrine Moyer Bergman PLC

(57) ABSTRACT

Disclosed is an inclined mobile screen for processing road building materials which provides for easy reconfiguration of the screen from operation configuration to a transport configuration and to a maintenance configuration, which allows for increased clearance between the screen and a feed conveyor without requiring a hydraulic actuator disposed therebetween. Nested telescopic supports are selectively coupled together in an offset connection to allow changes in the orientation of the screen to result in changes in the separation between the screen and the conveyor so as to allow for more clearance therebetween during time of maintenance.

20 Claims, 5 Drawing Sheets

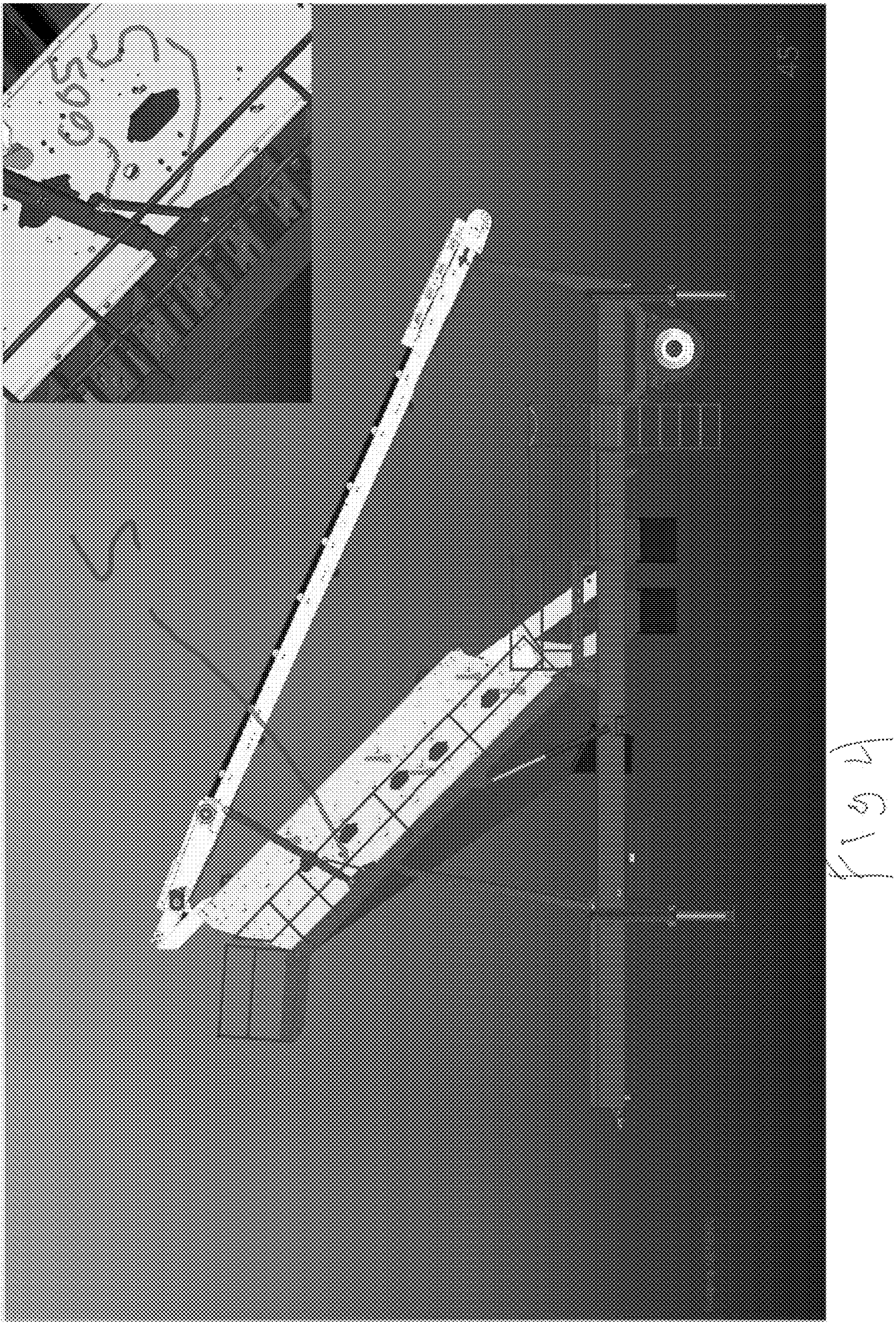

SCREEN MAINTENANCE LINK

CROSS REFERENCE TO RELATED APPLICATIONS

The present application is a divisional application of the non-provisional patent application having Ser. No. 16/202,872 filed on Nov. 28, 2018, which application claims the benefit of the filing date of provisional patent application having Ser. No. 62/592,035 filed on Nov. 29, 2017 by the same inventors, which applications are incorporated herein in their entirety by this reference.

FIELD OF THE INVENTION

The present invention generally relates to mobile vibrating screens used in mining or road building material handling and processing.

BACKGROUND OF THE INVENTION

In the past, vibrating screen machines are normally made of a box-like structure and contain one or multiple layers of screen mesh to sort granular materials. The different sized openings in the mesh allow sizing of materials according to the size of these openings. The box structure usually contains at least one eccentric weighted shaft that shakes the box and its screen mesh to agitate and separate the granular materials fed into the top of the machine.

Vibrating screens must receive maintenance to continue in long term operation. One common type of maintenance is replacement of the screen wire. Many mobile screens can be operated in an inclined orientation but may need to be at or near a horizontal orientation for screen wire replacement to optimally occur. This substantially horizontal orientation of the screen is also often seen when the screen is in a transport configuration. However, this transport configuration also often has a feed conveyor cross tube support resting on a top flange of the sides of the screen. This configuration often leaves minimal access to the top screen deck for replacement of the screen wire.

Consequently, there is a need for an inexpensive and efficient way to provide ample clearance for replacement of the screen wire when the screen is in a horizontal configuration.

SUMMARY OF THE INVENTION

It is an object of the present invention to provide a mobile vibrating screen machine which can be configured for maintenance with a horizontal screen and an elevated feed conveyor to permit ample clearance for replacement of the screen wire, without a need for a hydraulic cylinder coupled between the screen and the feed conveyor.

It is a possible feature of the present invention to provide a selectively deployable mechanical link to hold the feed conveyor in an elevated position.

It is another possible feature of the present invention to provide a non-powered tube in tube feed conveyor support.

It is an advantage of the present invention to utilize only screen lifting actuators and system geometries of motion to move the feed conveyor into an elevated maintenance position, relative to the screen.

The present invention is an apparatus and method for screening material which is designed to satisfy the aforementioned needs, provide the previously stated objects, include the above-listed features, and achieve the already articulated advantages. For some maintenance operations, the present invention is carried out in an "extra hydraulic cylinder-less system" in a sense that the insufficient clearance between the screen wire and the feed conveyor support during maintenance has been eliminated without the need for any hydraulic cylinder between the screen and feed conveyor.

Accordingly, the present invention is a system and method for replacement of screen wire, while the screen is in a horizontal or transport orientation, which includes:

- a vibrating screen coupled to a screen base; which screen base is pivotally coupled at one end to a base mainframe;
- an overhead feed conveyor configured to provide material to be screened to the vibrating screen at various operating angles;
- said overhead feed conveyor is coupled to the screen base via the screen base to a first conveyor tube-in-tube support leg which comprises a first outer tube and a first inner tube; and
- a screen maintenance link which is selectively coupled, through an offset connection, between the first outer tube and the first inner tube, so that when said screen maintenance link is coupled to the first outer tube, and the vibrating screen is lowered, a combined length of the screen base to the first conveyor tube-in-tube support leg is more than it would be if the vibrating screen were lowered to a horizontal position without coupling the screen maintenance link.

The present invention is also a system for screening material comprising:

- a screen coupled to a base; which base is coupled at one end to a base mainframe;
- an overhead feed conveyor configured to provide material to be screened to the screen at a plurality of operating angles;
- said overhead feed conveyor is coupled to the base via the base to a first conveyor tube-in-tube support leg which comprises a first outer tube and a first inner tube; and
- a maintenance link which is coupled, through a connection, between the first outer tube and the first inner tube, so that when said maintenance link is coupled to the first outer tube, and the screen is lowered, a combined length of the base to the first conveyor tube-in-tube support leg is more than it would be if the screen were lowered to a horizontal position without coupling the maintenance link.

BRIEF DESCRIPTION OF THE DRAWINGS

The invention may be more fully understood by reading the following description of the preferred embodiments of the invention, in conjunction with the appended drawings wherein:

FIG. 2 is close up of a portion of FIG. 1.

FIG. 4 is a side view of the present invention with the screen elevated and the maintenance link connected.

FIG. 5 is a close up of a portion of FIG. 4.

DETAILED DESCRIPTION

Figure 1:
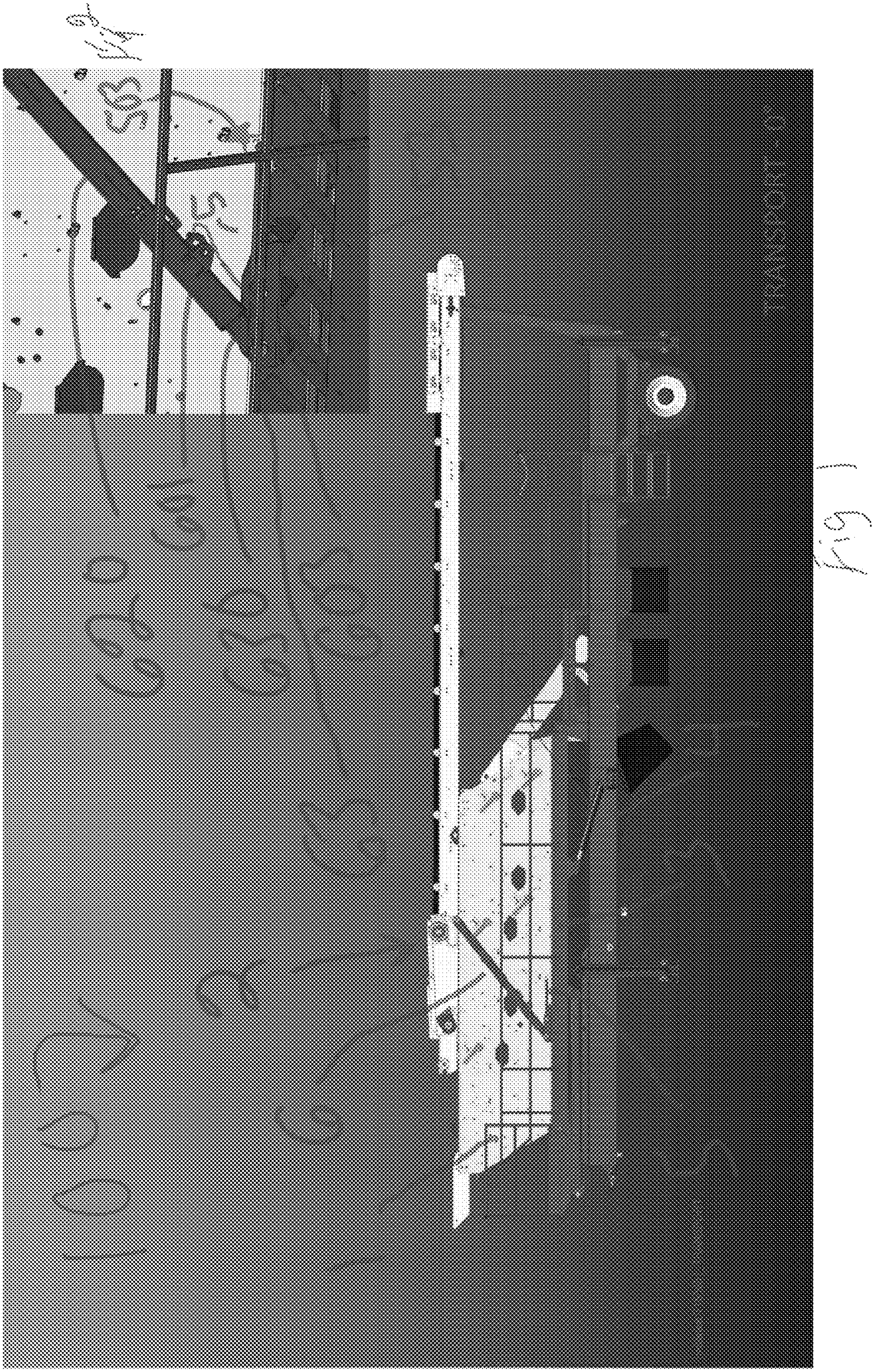
FIG. 1 is a side view of a vibrating screen of the present invention, shown in a transport configuration.

Now referring to the drawings wherein like numerals refer to like matter throughout, and more particularly to FIG. 1, there is shown a vibrating screen system 100 of the present invention, shown in a transport configuration with vibrating screen 1, overhead feed conveyor 2, screen base 3, and base mainframe 4, each in a horizontal orientation, and with overhead feed conveyor 2 being disposed directly on top of vibrating screen 1. Screen base to conveyor tube-in-tube support legs 6 are shown in an orientation which is not necessarily providing support to overhead feed conveyor 2. Screen maintenance link 5 is shown detached from screen base to conveyor tube-in-tube support legs 6 and in a horizontal orientation. Base mainframe to screen base hydraulic actuator 41 is shown in a retracted configuration which is not necessarily providing support to screen base 3. Base mainframe to conveyor support 7 is shown as being pivotally coupled to overhead feed conveyor 2 and fixed to base mainframe 4, however in some embodiments the fixed connection could also be made to pivot.

Now referring to FIG. 2, there is shown a close up view of a portion of the vibrating screen system 100 of FIG. 1. Screen base to conveyor tube-in-tube support legs 6 are shown to be inner tube 630 and outer tube 620, which is shown having outside pin receiving void 601 and inside pin receiving void 603. Screen maintenance link 5 is clearly not coupled to outer tube 620 and removable maintenance link pin end 503 is pivoted about link to screen base offset pivotal connection 53 to be substantially horizontal.

Figure 3:
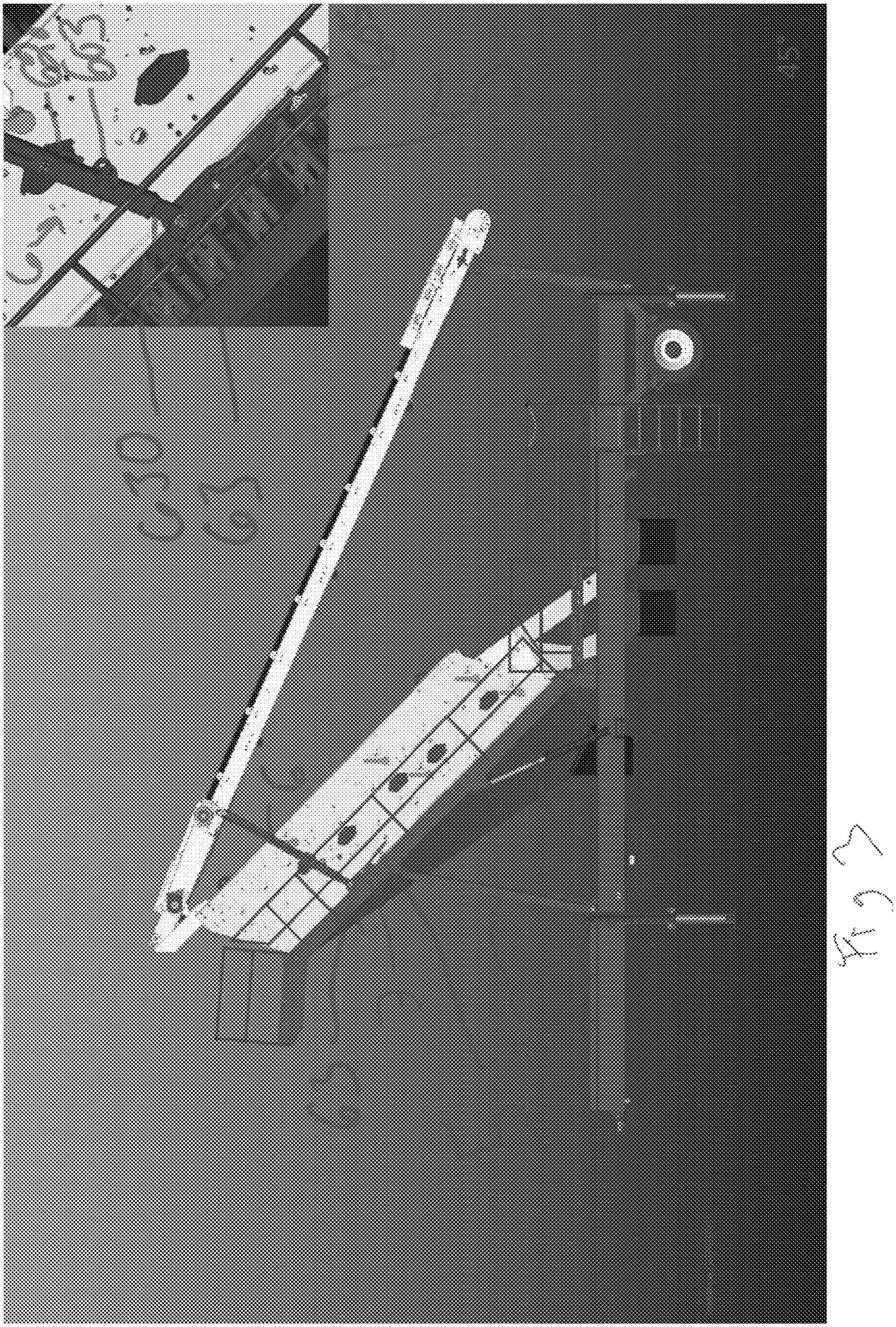
FIG. 3 is a side view of the present invention, with the screen elevated.

Now referring to FIG. 3, there is shown a view of the mobile vibrating screen system 100 with the screen in an operating inclination of about 45 degrees. Clearly, base mainframe to screen base hydraulic actuator 41 is extended and providing support. Screen maintenance link 5 remains disconnected from screen base to conveyor tube-in-tube support legs 6, which are now pivoted more than 90 degrees with respect to the screen base 3.

Now referring to FIG. 4, there is shown a configuration identical to FIG. 3 except that screen maintenance link 5 is coupled to screen base to conveyor tube-in-tube support legs 6. With the screen maintenance link 5 connected, the screen base to conveyor tube-in-tube support legs 6 are connected to each other through an offset connection, which forces the outer tube 620 and inner tube 630 to expand away from each other as geometry of the linkage changes during the process of lowering the vibrating screen 1 to a lower position for maintenance, but with more clearance between the vibrating screen 1 and the overhead feed conveyor 2.

Now referring to FIG. 5, there is shown a close up view of the screen maintenance link 5 portion of FIG. 4, which shows removable maintenance link pin 605 inserted and thereby coupling screen maintenance link 5 to outside pin receiving void 601 and inside pin receiving void 603.

Figure 6:
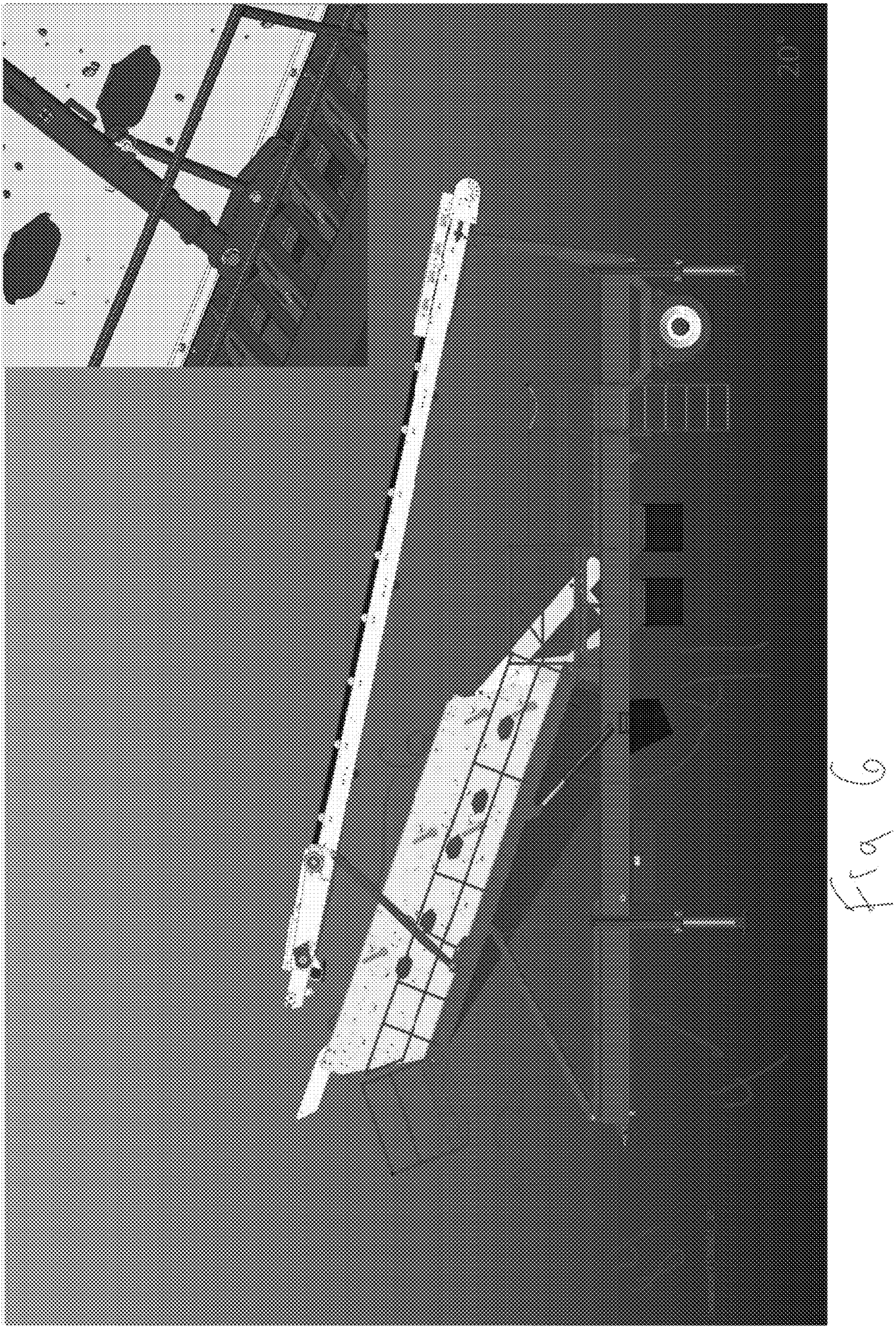
FIG. 6 is a side view of the present invention after the screen has been lowered to an intermediate elevation.

Now referring to FIG. 6, there is shown a view of the mobile vibrating screen system 100 with the vibrating screen 1 oriented at about 20 degrees. Base mainframe to screen base support 8 is shown being pivoted about both screen side pivot end 83 and mainframe side pivot end 84 to facilitate the lowering of the vibrating screen 1 closer to base mainframe 4.

Figure 7:
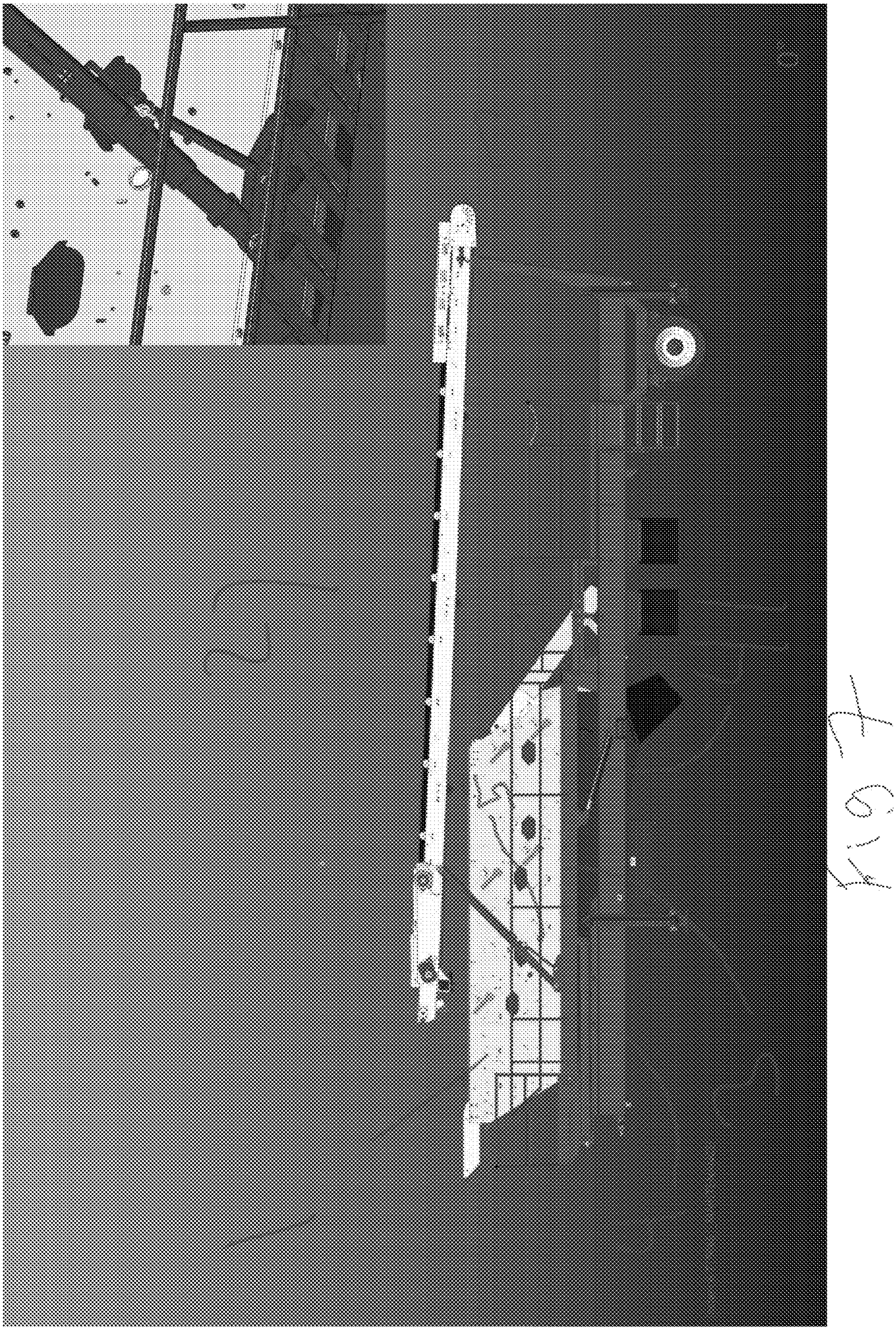
FIG. 7 is a side view of the present invention with the screen at a horizontal orientation and the feed conveyor elevated therefrom with the maintenance link coupled.

Now referring to FIG. 7, there is shown special orientation of the mobile vibrating screen system 100 where the vibrating screen 1 is horizontal and the overhead feed conveyor 2 is not resting on vibrating screen 1 because of the connection of screen maintenance link 5 and retraction of base mainframe to screen base hydraulic actuator 41. This configuration allows for a maintenance configuration without a need to add a dedicated linear actuator to increase the separation between vibrating screen 1 and overhead feed conveyor 2.

In operation, the present invention can function as follows:

A selection is made as to whether maintenance is to be done or the screen is to be put in transport mode, The selection results in the conveyor ending up with more clearance above the screen if the selection is for maintenance to be done and for less clearance if the screen is put into transport mode, As the screen is lowered closer to a horizontal orientation the conveyor is oriented with the selected clearance without the need to use any sources of power other than those used to incline the screen for operation.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

We claim:

1. A material sorting screen comprising:

a vibrating screen coupled to a screen base; which screen base is pivotally coupled at one end to a base mainframe;

an overhead feed conveyor configured to provide material to be screened to the vibrating screen at various operating angles;

said overhead feed conveyor is coupled to the screen base via the screen base to a first conveyor tube-in-tube support leg which comprises a first outer tube and a first inner tube; and a screen maintenance link which is selectively coupled, through an offset connection, between the first outer tube and the first inner tube, so that when said screen maintenance link is coupled to the first outer tube, and the vibrating screen is lowered, a combined length of the screen base to the first conveyor tube-in-tube support leg is more than it would be if the vibrating screen were lowered to a horizontal position without coupling the screen maintenance link.

2. The material sorting screen of claim 1 further comprising: a source of hydraulic power disposed between and configured to cause relative motion between said screen base and said base mainframe.

3. The material sorting screen of claim 2 wherein said vibrating screen is free of any hydraulic and electric components which provide power to cause relative motion between said screen base and said overhead feed conveyor, other than said source of hydraulic power disposed between and configured to cause relative motion between said screen base and said base mainframe.

4. The material sorting screen of claim 3 further comprising: a removable maintenance link pin used for coupling said screen maintenance link to said first outer tube.

5. The material sorting screen of claim 4 wherein an output end of said overhead feed conveyor is detachably coupled to said screen base.

6. The material sorting screen of claim 4 wherein said overhead feed conveyor is detachable through translation of a protuberance along an open-ended slot.

7. The material sorting screen of claim 3 wherein said base mainframe to conveyor support is rigidly coupled to said base mainframe.

8. The material sorting screen of claim 5 wherein said overhead feed conveyor is detachable through translation of a protuberance along an open-ended slot.

9. The material sorting screen of claim 8 wherein said vibrating screen is fixed to said screen base.

10. The material sorting screen of claim 9 further comprising a second conveyor tube-in-tube support leg which comprises a second outer tube and a second inner tube.

11. A material sorting screen comprising:

a screen coupled to a base; which base is coupled at one end to a base mainframe;

an overhead feed conveyor configured to provide material to be screened to the screen at a plurality of operating angles;

said overhead feed conveyor is coupled to the base via the base to a first conveyor tube-in-tube support leg which comprises a first outer tube and a first inner tube; and a maintenance link which is coupled, through a connection, between the first outer tube and the first inner tube, so that when said maintenance link is coupled to the first outer tube, and the screen is lowered, a combined length of the base to the first conveyor tube-in-tube support leg is more than it would be if the screen were lowered to a horizontal position without coupling the maintenance link.

12. The material sorting screen of claim 1 further comprising: a source of hydraulic power disposed between and configured to cause relative motion between said base and said base mainframe.

13. The material sorting screen of claim 2 wherein said screen is free of any hydraulic and electric components which provide power to cause relative motion between said base and said overhead feed conveyor, other than said source of hydraulic power disposed between and configured to cause relative motion between said base and said base mainframe.

14. The material sorting screen of claim 3 further comprising: a removable maintenance link pin used for coupling said maintenance link to said first outer tube.

15. The material sorting screen of claim 4 wherein an output end of said overhead feed conveyor is detachably coupled to said base.

16. The material sorting screen of claim 4 wherein said overhead feed conveyor is detachable through translation of a protuberance along an open-ended slot.

17. The material sorting screen of claim 3 wherein said base mainframe to conveyor support is rigidly coupled to said base mainframe.

18. The material sorting screen of claim 5 wherein said overhead feed conveyor is detachable through translation of a protuberance along an open-ended slot.

19. The material sorting screen of claim 8 wherein said screen is fixed to said screen base.

20. The material sorting screen of claim 19 further comprising a second conveyor tube-in-tube support leg which comprises a second outer tube and a second inner tube.

* * * * *